(12) United States Patent
Martino

(10) Patent No.: US 7,806,243 B2
(45) Date of Patent: Oct. 5, 2010

(54) VEHICULAR BRAKE ROTORS

(76) Inventor: Gerald Martino, Route 6, Box 2390, Mt. Pleasant, PA (US) 15666

( * ) Notice: Subject to any disclaimer, the term of this patent is extended or adjusted under 35 U.S.C. 154(b) by 571 days.

(21) Appl. No.: 11/880,485

(22) Filed: Jul. 23, 2007

(65) Prior Publication Data

US 2009/0026026 A1   Jan. 29, 2009

(51) Int. Cl.
*F16D 65/12* (2006.01)
(52) U.S. Cl. .............................. 188/218 XL; 188/16 R
(58) Field of Classification Search ........... 188/218 XL, 188/17, 18 R, 18 A; 419/2, 5
See application file for complete search history.

(56) References Cited

U.S. PATENT DOCUMENTS

| | | | |
|---|---|---|---|
| 3,888,663 A * | 6/1975 | Reichman | 419/2 |
| 4,063,939 A * | 12/1977 | Weaver et al. | 419/5 |
| 2007/0234929 A1 * | 10/2007 | Reinsch et al. | 106/1.18 |
| 2008/0060891 A1 * | 3/2008 | Chen et al. | 188/218 XL |

* cited by examiner

*Primary Examiner*—Melanie Torres Williams
(74) *Attorney, Agent, or Firm*—Andrew Alexander; Gary P Topolosky

(57) ABSTRACT

Vehicular brake rotor formed by powder metallurgy including metals such as titanium powder.

40 Claims, 4 Drawing Sheets

VEHICULAR BRAKE ROTORS

FIELD OF THE INVENTION

This invention relates to manufacturing vehicular parts by powder metallurgy techniques and more particularly to making vehicular brake rotors by powder metallurgy using powders, such as titanium powder.

BACKGROUND OF THE INVENTION

Traditionally automotive brake rotors have been made using cast iron which provides good wear resistance and high temperature properties. However, cast iron is dense relative to other materials so that a cast iron brake rotor is heavy. A heavy brake rotor is undesirable for at least three reasons. First, a heavy brake rotor contributes to the overall weight of a motor vehicle and thus reduces its fuel efficiency and increases its emissions. Secondly, a brake rotor is part of the unsprung vehicle weight, meaning the weight below the springs. Unsprung weight adds to the noise, vibration, and harshness (sometimes referred to as "NVH") associated with vehicle operation. When unsprung weight is reduced, NVH is usually improved. Thirdly, a brake rotor is a vehicle part that requires rotation during use. Accordingly a heavier brake rotor requires additional energy to increase and decrease rotational speed. Reducing weight of a vehicle rotor also lowers vibration during rotation. Carbon-carbon composites, ceramics, and cermets have also been considered for use in brake rotors but they are expensive and have not achieved widespread adoption as vehicle rotors.

Titanium has been considered as a brake rotor material in Murphy U.S. Pat. No. 5,521,015 and Martino U.S. Pat. No. 5,901,818, incorporated herein by reference. Titanium has excellent strength to weight properties, and it retains strength at high temperatures. However, high costs have heretofore prevented widespread adoption of titanium and its alloys in vehicle brake rotors. Accordingly there still remains a great need for a low cost process for manufacturing titanium brake rotors.

Other brake rotors are shown in U.S. Pat. No. 4,278,153, which discloses a brake disk frictional module composed of sintered metallic material reinforced throughout its entire volume by a grid system of pure metal or metallic alloy. The friction module may be manufactured by sintering the metallic material with the grid reinforcement in either a mold or within the brake disk cup. The internal reinforcement of the frictional module prevents spalling weight loss, friction coefficient decay, or other physical defect as caused by frictional strain during use. The reinforcement material reduces the overall temperature of the disk during use, and aids frictional coefficient of the disk because of the metallic compatibility of the metallic material and grid system.

U.S. Pat. No. 5,620,791 discloses metal and ceramic matrix composite brake rotors comprising an interconnected matrix embedding at least one filler material. In the case of metal matrix composite materials, at least one filler material comprises at least about 26% by volume of the brake rotor for most applications, and at least about 20% by volume for applications involving passenger cars and trucks. In a preferred embodiment of the present invention, the metal matrix composite brake rotor comprises an interconnected metal matrix containing at least about 28% by volume of a particulate filler material and more preferably at least about 30% by volume. Moreover, the composite rotors of the present invention exhibit a maximum operating temperature of at least about 900° F. and preferably at least about 950° F. and even more preferably at least about 975° F. and higher.

U.S. Pat. No. 4,381,942 discloses a process for the production of titanium-based alloy members by powder metallurgy. This process consists of: (a) preparing a titanium or titanium alloy powder having a grain size distribution between 100 and 1000 µm, (b) depositing on said powder a coating of a material such that on contact with the titanium or titanium alloy it forms a liquid phase at a temperature $T_1$ which is below the allotropic transformation temperature T of the titanium or titanium alloy constituting the said powder, (c) introducing the thus coated powder into a mould, and (d) hot compressing this powder in the mould at a pressure of 10 to 30 MPa at a temperature between $T_1$ and T for a time such that a complete densification of the powder is obtained. This invention has application to the construction of discs for turbines with integrated blades.

U.S. Pat. No. 4,719,074 discloses a metal-ceramic composite article produced by fitting a projection formed on a ceramic member into a hole formed in a metallic member having a hardened region and an unhardened region on its surface such that the ceramic member is monolithically bonded to the metallic member and the deformed region of the metallic member resulting from the fitting is located within its unhardened range, has a high bonding force between the ceramic member and the metallic member and is adapted to be used in engine parts, such as turbocharger rotor, gas turbine rotor and the like, and other structural parts exposed to high temperature or to repeating loads, by utilizing the heat resistance, wear resistance and high strength of the ceramic.

U.S. Pat. No. 5,053,192 discloses deforming combustion products by extrusion at an extrusion temperature chosen in the range from 0.3 $T_1$ to $T_2$, wherein $T_1$ is the melting point of a hard phase of the combustion products and $T_2$ is the melting point of a binder material in a container (5) made up of vertically extending segments (12) defining spaces (13) with one another and having a die (14) and a heat insulated sizing member (17) the temperature conditions of extrusion being controlled by means of a unit (21) having a temperature pick-up (22) and a member (23) receiving information from the pick-up (22) and sending a command for moving the punch (10).

U.S. Pat. No. 5,139,720 discloses manufacturing a sintered ceramic material using the heat generated in a thermit reaction as a heating source, a pre-heating is applied preceding to the sintering step or a mixture comprising: (A) at least one ceramic powder, (B) at least one non-metallic powder selected from the group consisting of carbon, boron and silicon, and (C) a metal powder and/or a non-metallic powder other than the above-mentioned (B) is used. Homogeneous and dense sintered ceramic material or sintered composite ceramic material can be obtained by this method, and the fine texture thereof, and the phase constitution, the phase distribution and the like of the composite ceramic phase can be controlled sufficiently.

U.S. Pat. No. 5,701,943 discloses a metal matrix composite made by blending non-metal reinforcement powder with powder of metal or metal alloy matrix material, heating to a temperature high enough to cause melting of the matrix metal/alloy and subjecting the mixture to high pressure in a die press before solidification occurs.

A principal advantage of the present invention is that it enables, for example, titanium brake rotors to be manufactured at a relatively low cost. The invention also provides, for example, titanium brake rotors at substantially lower cost than prior art carbon-carbon composite brake rotors. Other advantages of the invention will become readily apparent to persons skilled in the art from the following specification and claims.

SUMMARY OF THE INVENTION

The process of the invention includes steps of mixing particles of titanium or a titanium alloy with a nonmetallic material to form a mixture, compressing the mixture to form a preform, and sintering the preform at an elevated temperature to form a vehicle component such as a brake rotor. Titanium powder may contain some impurities, principally about 0.12 wt % titanium dioxide. The titanium powder has a median particle size of about 1-100 microns, preferably about 3-30 microns and more preferably about 5-10 microns. Particle surface area is greater than about 25 $m^2/g$ preferably about 50-250 $m^2/g$. Aspect ratio is about 5 to 300. Suitable titanium alloys include, for example, Ti-6Al-4V, Ti-6Al-6V-2Sn, Ti-6Al-2Sn-4Zr-2Mo, Ti-10V-2Fe-3Al, and Ti-5Al-2.5Sn.

The mixture contains about 30-95 parts by weight titanium or titanium alloy and about 5-70 parts by weight of the nonmetallic material. Preferably the mixture contains about 60-80 parts by weight titanium or titanium alloy and about 20-40 parts by weight nonmetallic material. The nonmetallic material can be provided as particles, fibers, whiskers, flakes, or mixtures thereof. Suitable nonmetallic materials are ceramics including silicon carbide, boron carbide, tungsten carbide, chromium carbide, alumina, zirconium oxide, silicon nitride, boron nitride, and titanium diboride, solely or in various combinations with each other. Optionally the mixture may contain up to about 10 parts by weight of an organic binder, as explained below in more detail. The ingredients are preferably mixed together by milling, such as jet milling. A particularly preferred mixture contains about 70 parts by weight titanium powder and about 30 parts by weight silicon carbide powder. Optionally, up to about 10 parts by weight boron nitride may also be included.

Optional ingredients in the mixture include up to about 10 parts by weight of an organic binder and up to about 20 parts by weight boron nitride. The organic binder improves green strength before the titanium-containing mixture is sintered. Sintering converts the organic binder to metal carbides, water, and carbon dioxide. Selection of an appropriate binder requires that any organic content remaining in the product not affect performance, even at MOT (maximum operating temperature).

The predominant failure mode of metal brake rotors is by surface scuffing. As a brake rotor is subjected to progressively more severe conditions, the temperature of the rotor continues to rise until it reaches a temperature at which a glaze is formed on the rubbing surfaces. The temperature at which the rotor surface breaks down and scuffing ensues is the Maximum Operating Temperature or MOT. Rotor breakdown is followed by rapid wear of the brake pads and a rise in temperature as measured by the pad thermocouples. The MOT for brake rotors is measured by dynamometer tests in accordance with SAE J212 entitled "Brake System Dynamometer Test Procedures—Passenger Car" published by SAE International, of Warrendale, Pa., in January, 1998.

It is an object of the invention to provide an improved brake rotor.

In addition, there is provided a process for making an improved titanium brake rotor. The process comprises providing titanium or titanium alloy powder having, for example, an average particle size of about 1-100 microns, a mean aspect ration of about 5 to 300, and specific surface area of at least about 25 $m^2/g$. Further, the process includes mixing a titanium or titanium alloy powder with a nonmetallic material to provide a mixture. A brake rotor mold is provided and a first layer of the mixture is poured into the mold. Then, a second layer comprising titanium powder is poured into the mold on top of the first layer. A third layer of the mixture is then poured on top of the titanium powder layer. The powder in the mold is compressed to form a preformed brake rotor or green body, and the preform is sintered to provide a brake rotor having first and second opposed sides having nonmetallic containing wear layers on each of the sides.

Preferably, the mixture contains 5-40 wt. % nonmetallic powder. The nonmetallic powder is comprised of at least one of the group consisting of silicon carbide, boron carbide, tungsten carbide, chromium carbide, alumina, zirconium oxide, silicon nitride, boron nitride, and titanium diboride, solely or in various combinations with each other.

The preferred nonmetallic powder is silicon carbide. The sintering step can be carried out in a temperature range of 1400° to 2200° F., preferably in the range of 1500° to 2100° F. The sintering step may be carried out utilizing microwaves or conventional radiation-conduction-convection heating. In the microwave process, the heat is generated internally within the material instead of originating from external heating sources, which results in rapid heating and shorter heating cycles with less energy requirements as compared to conventional heating methods. Microwaves are electromagnetic radiation with wavelengths ranging from 1 mm to 1 m in free space and frequency between 0.3 GHz to 300 GHz. Typical frequencies for materials processing are 0.915 GHz, 2.45 GHz, 5.8 GHz, and 24.124 GHz with 2.45 GHz as the standard for industrial and scientific applications. The rotor is densified to at least 50-75% after sintering, preferably to 95-100%.

A coating to provide a second wear surface may be applied by plasma spraying the surfaces of the wear layers. Thus, the rotor can include a coating applied to the first and second sides of the rotor. The coating can include a bond coat containing nickel, an intermediate coat comprising zirconium oxide, chromium carbide, and nickel, and a top coat comprising zirconium oxide and chromium carbide. The top coat can comprise about 65 to 75 parts by weight zirconia and about 25 to 35 parts by weight chromium carbide, and the bond coat further can contain aluminum. The top coat and the intermediate coat can contain a lesser amount of nickel and aluminum than the bond coat.

Specifically, to first and second sides of the rotor, there may be applied a coating comprised of a bond coat of about 4.5 wt % aluminum and about 95.5 wt % nickel; an intermediate coat of about 70 parts by weight zirconia, 30 parts by weight of a composition as used for the bond coat, and 10 parts by weight chromium carbide; and a top coat of about 70 parts by weight zirconium oxide and about 30 parts by weight chromium carbide.

The inventive process for making a brake rotor further comprises providing metallic powder having, for example, an average particle size of about 1-20 microns, a mean aspect ratio of about 5 to 300, and specific surface area of at least about 25 $m^2/g$. The process includes mixing the metallic powder with about 5 to 70 wt. % of a nonmetallic material to provide a mixture. A brake rotor mold is provided, and a first layer of the mixture is poured into the mold. A second layer of the metallic powder is then poured into the mold on top of the first layer. A third layer of the mixture is poured on top of the titanium powder layer. The powder in the mold is compressed to form a preformed brake rotor, and the preform is sintered to provide a brake rotor having first and second sides having nonmetallic containing wear layers on each of the sides.

The metallic powder is selected from the group consisting of titanium, steel, stainless steel, cast iron, and alloys thereof.

Further, the invention includes a process for making an improved titanium brake rotor. The process comprises providing titanium or a titanium alloy powder having, for example, an average particle size of about 1-20 microns, a mean aspect ratio of about 5 to 300, and specific surface area of at least about 25 m$^2$/g. Further, the process includes mixing a titanium or titanium alloy powder with 5 to 60 wt. % of a silicon carbide powder or material to provide a mixture. A brake rotor mold is provided, and a first layer of the mixture is poured into the mold. Then, a second layer of the titanium powder is poured into the mold adjacent the first layer. A third layer of the mixture is then poured on top of the titanium powder layer. The powder in the mold is compressed to form a preformed brake rotor, and the preform is sintered to provide a brake rotor having first and second opposed sides having silicon carbide containing wear layers on each of the sides.

Thus, an improved titanium brake rotor is provided comprised of a central layer of a metal or metal alloy sandwiched between two outside layers comprised of a mixture of metal or metal alloy and a nonmetallic material, which outside layer provides brake wear layers on the rotor. These rotors may be formed as described herein. That is, the titanium brake rotor may be comprised of a central layer of a titanium or titanium alloy or other such metal, e.g., iron, steel, or stainless steel and alloys thereof, sandwiched between two outside layers comprised of a mixture of titanium or titanium alloy and silicon carbide to provide brake wear layers on the rotor. The rotor can be formed by processes described herein.

DETAILED DESCRIPTION OF PREFERRED EMBODIMENTS

Figure 1:
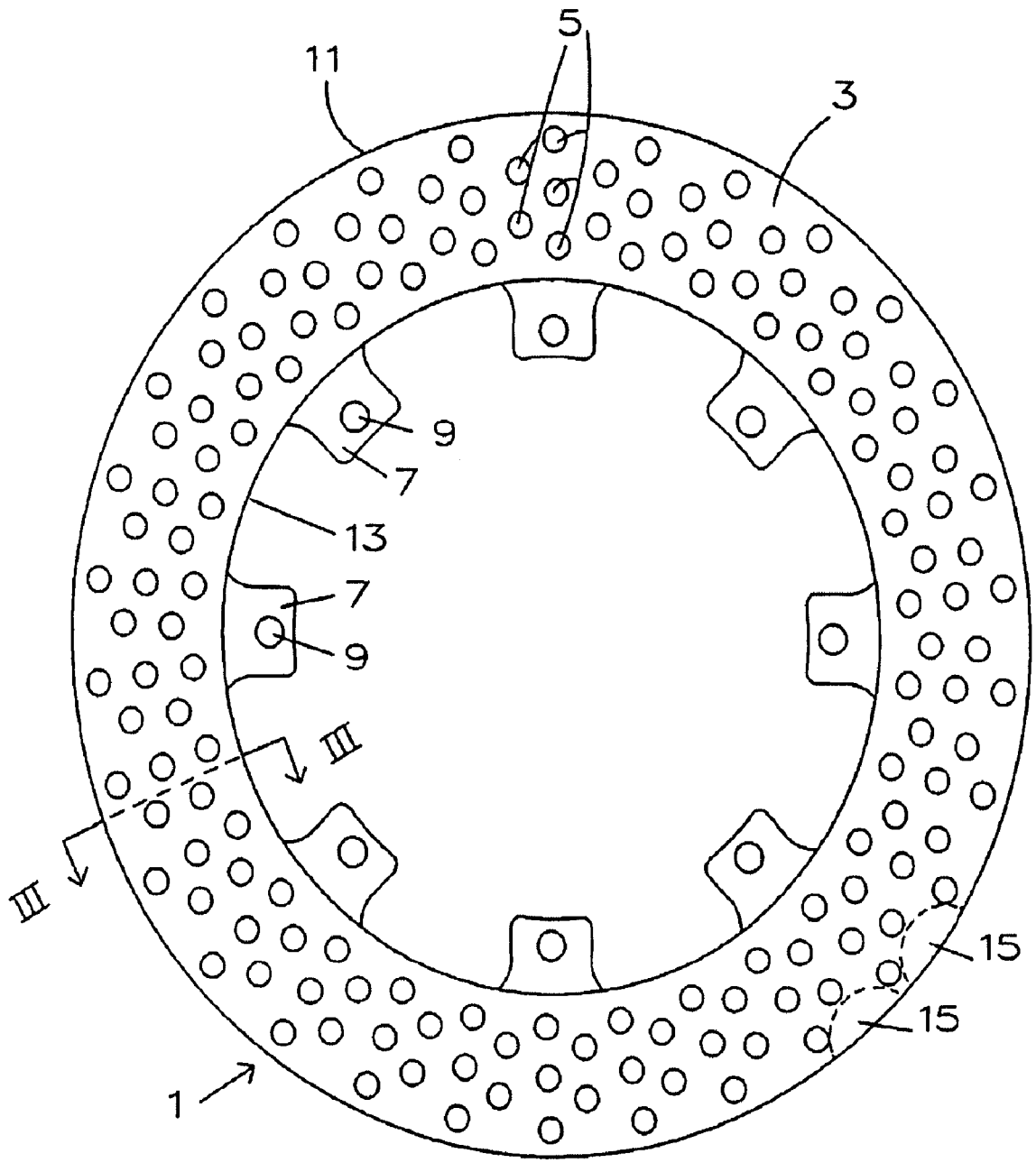
FIG. 1 shows a plan view of a brake rotor according to the present invention.

In accordance with a preferred embodiment of the present invention illustrated in FIG. 1, a brake rotor 1 includes two opposite braking surfaces 3, one of which is shown in FIG. 1. The braking surfaces are oriented parallel to one another.

The rotor 1 has an outer peripheral surface 11 and an inner peripheral surface 13. The rotor can have a series of holes 5 distributed on its braking surfaces and passing through the rotor, from one braking surface 3 on one side of the rotor, to the braking surface 3 on the other side of the rotor. A plurality of lugs 7 are arranged uniformly about the inner peripheral surface 13 of the rotor 1 and extend radially inwardly. Each lug 7 is appropriately provided with a hole 9 for connection with a hub member.

Figure 2:
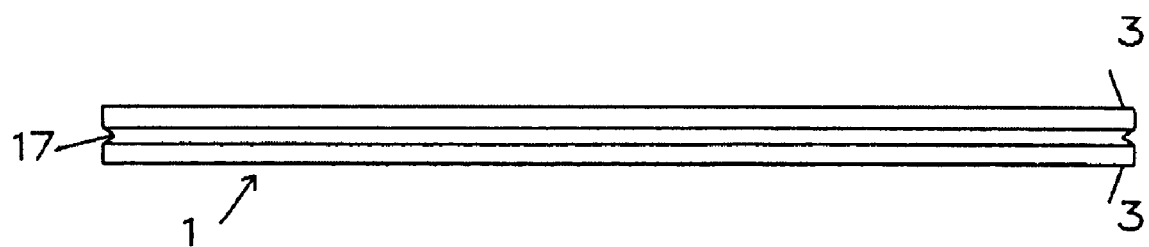
FIG. 2 shows an elevational view of the brake rotor illustrated in FIG. 1.

FIG. 2 is an elevational view of the brake rotor illustrated in FIG. 1. The outer peripheral surface 11 (see FIG. 1) of the rotor 1 is indented about substantially its entire circumference with a groove 17.

Figure 3:
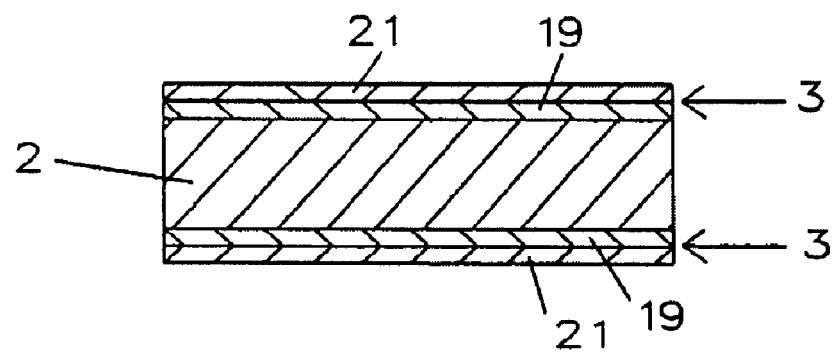
FIG. 3 is a cross-section, taken along III-III of FIG. 1, which schematically illustrates different layers associated with a brake rotor according to the present invention.

FIG. 3 provides a detailed and exaggerated cross-sectional view of rotor 1, the view being taken along line III-III of FIG. 1. As illustrated schematically in FIG. 3, rotor comprised of a substrate 2, which carries a braking surface 3 on each of its two broad sides. In the illustrated embodiment, each braking surface 3 is composed of two layers, which are referred to herein as "coats". Thus, each braking surface is composed of a bond coat 19 and a top coat 21. The particular composition of these layers will be discussed more fully below, as well as methods for applying the same to the braking surfaces 3. Generally, however, bond coat 19 may include a thin layer comprised of nickel. The top coat 21 is a ceramic composition of zirconium oxide and chromium carbide, preferably in the range of 65 to 75 parts by weight zirconium oxide and 25 to 35 parts by weight chromium carbide. Preferably, bond coat 19 and top coat 21 are preferably applied to the braking surfaces 3 by plasma spraying techniques which are well known to those of ordinary skill in the art. Following application of the materials by plasma spraying, the braking surface is ground smooth. As used herein with respect to the bond coat 19 and the top coat 21, the term "nickel" includes nickel, nickel alloys such as nickel-chromium alloys, and nickel aluminide.

As a general rule, increasing the chromium carbide relative to the zirconium oxide increases the wear resistance of the braking surface, while increasing the zirconium oxide relative to the chromium carbide increases the coefficient of friction of the braking surface.

Coatings composed of more than two layers may, of course, be used, and may even be preferred, for instance for the purpose of making transitions between different coefficients of thermal expansion less abrupt, or for the purpose of introducing various kinds of materials offering special advantages. The Example below, for instance, uses three layers, a bond coat, an intermediate coat, and a top coat.

Figure 4:
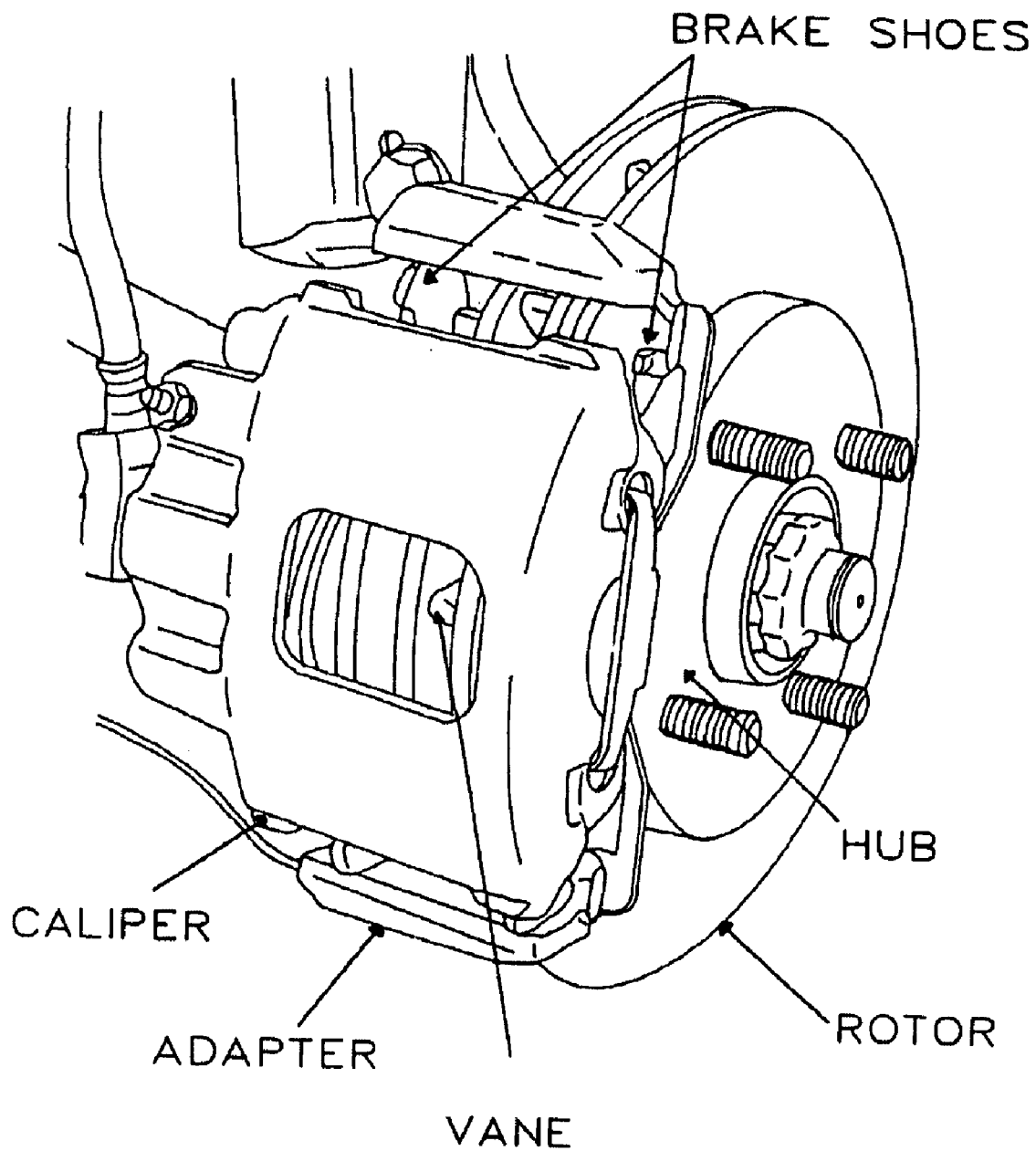
FIG. 4 illustrates a typical brake assembly employing a brake rotor according to the present invention.

FIG. 4 illustrates a typical brake assembly in which a brake rotor according to the present invention is employed. Various components of the brake assembly are indicated by name. It will be understood that the "brake shoes" may be considered as including friction pads. Unlike the single-plane rotor of FIGS. 1 to 3, the rotor of FIG. 4 is a vaned rotor composed of two planes, each having an outwardly facing braking surface composed of coats, as described with reference to FIG. 3. The two planes are separated by inwardly situated vanes. The rotors of the invention may, or may not, have holes 5 in the braking surfaces, and, to illustrate this variation, the vaned rotor illustrated in FIG. 4 does not have holes 5. Vaned rotors may be manufactured using jigs to hold the vanes in place relative to the planes, followed by TIG welding of the vanes to the interior surfaces of the planes. Alternatively, vaned rotors may cast as one unit, using casting processes, such as investment casting, or may be formed by powder metallurgy techniques described herein. Wear layers may be formed on the vaned rotor by the powder metallurgy technique described herein.

Suitable materials for substrate 2 are cast iron, steel, titanium and its alloys as described above, and titanium composites made by powder metallurgy techniques. Sintered titanium composites made by powder metallurgy techniques are particularly preferred.

In accordance with my invention about 20 parts by weight titanium diboride powder were mixed with about 80 parts by weight titanium powder having less than 1 wt % impurities. The principal impurity in the titanium powder was titanium oxide, comprising about 0.12 wt % of the powder. The titanium powder was supplied by International Titanium Powder, LLC, of Lockport, Ill. Processes for making the titanium powder are described in Armstrong et al. U.S. Pat. Nos. 5,779, 761; 5,958,106; and 6,409,797. The Armstrong et al. patents are assigned to International Titanium Powder and their disclosures are incorporated herein by reference to the extent consistent with the present invention. The titanium powder has an aspect ratio of about 15 and specific surface area of about 100 m²/g. Its median particle size is about 5-10 microns although the particles tend to clump together into larger agglomerates. The titanium and titanium diboride powders were blended with about 1 wt % of an organic binder, isostatically pressed at room temperature into the shape of a brake rotor, sintered at an elevated temperature, and cooled overnight to ambient temperature.

The brake rotor described above may be used without any coating for some applications. For most uses however, a coating is applied to the braking surfaces 3. In preparation for receipt of the coating the braking surface 3 is grit-blasted or sand-blasted in a cabinet capturing the used media. Suitable sandblasting techniques are well known in the art.

The braking surfaces 3 are preferably coated with nickel aluminide to a coating thickness of about 0.005 inch. Thickness of the bond coating 19 ranges from about 0.001 inch to about 0.03 inch. The alloy is preferably applied by plasma spraying. Next, an intermediate coat 20 is applied by plasma spraying. The intermediate coat comprises about 70 parts by weight yttria stabilized zirconium oxide, 30 parts by weight of the composition used for the bond coat, and about 10 parts by weight chromium carbide.

Finally a top coat 21 is applied also by plasma spraying. The top coat comprises about 70 parts by weight yttria stabilized zirconium oxide and about 30 parts by weight chromium carbide.

Figure 5:
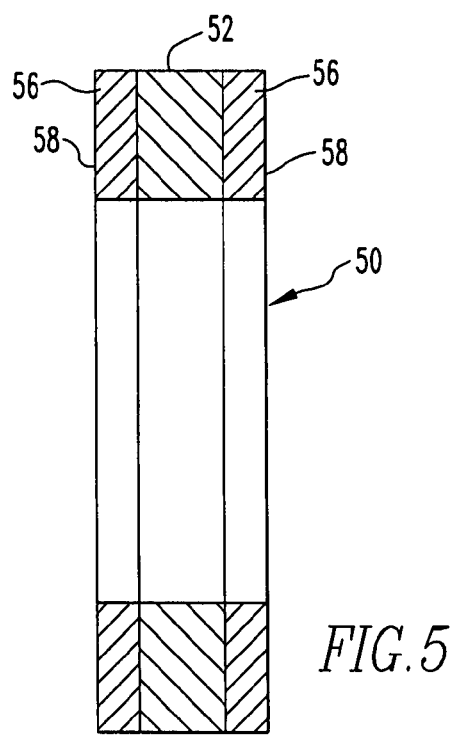
FIG. 5 is a cross section of a brake rotor of the invention.

Referring now to FIG. 5, there is illustrated another embodiment of the invention. FIG. 5 shows an improved rotor 50 formed using metal powders and metallurgical sintering techniques. That is, rotor 50 has a central core 52 sandwiched between two wear surfaces or layers 54 and 56. Core 52 is fabricated from metal powders, such as titanium, steel, stainless steel, and cast iron, and may contain controlled levels of nonmetallic material to aid in heat transfer or dissipation. The nonmetallic material may be selected from silicon carbide, boron carbide, tungsten carbide, chromium carbide, alumina., zirconium oxide, silicon nitride, boron nitride, and titanium diboride, solely or in various combinations with each other.

In accordance with the present invention, central core 52 is combined with two outside wear layers 54 and 56. Wear layers 54 and 56 may be comprised of the same metal as central core 52 or a different metal compatible with the central core. However, as presently understood, it is preferred that the wear layers utilize the same metal as the core.

Wear layers 54 and 56 are comprised of a metal powder and a nonmetallic material or powder. The metal powder is comprised of at least one metal from the group consisting of titanium, steel, and stainless steel, as noted. Typical alloys for the titanium are Ti-6Al-4V, Ti-6Al-6V-2Sn, Ti-6Al-2Sn-4Zr-2Mo, Ti-10V-2Fe-3Al, and Ti-5Al-2.5Sn.

The nonmetallic material or powder selected for the wear layer is at least one of the group selected from silicon carbide, boron carbide, tungsten carbide, chromium carbide, alumina., zirconium oxide, silicon nitride, boron nitride, and titanium diboride, solely or in various combinations with each other.

Metal powder such as titanium powder useful in the invention preferably has a particle size in the range of about 1-20 µm, a mean weight ratio of about 5-300 and a surface area in the range of 5 to 150 m²/g., typically about 25 m²/g.

Typically, the mixture of metallic, e.g., titanium, and nonmetallic, e.g., silicon carbide, particles comprises 5-60 wt. nonmetallic material, although in some instances the range for nonmetallic material may extend beyond this range. For purposes of sintering, this step may be carried out in a temperature range of 1400° to 2200° F., typically 1500° to 2100° F. As an example, heat may be supplied using microwaves generated in a 2.45 GHz multimode microwave furnace, which consists of a furnace chamber with vacuum capability, a microwave mode stirrer that breaks up any standing waves and creates a multimode field within the furnace chamber, and a 6 kW microwave generator that provides microwaves to the chamber via waveguides.

In the present invention, densification is at least 50% and usually more than 75%. However, the process is capable of providing rotors having 90-100% densification.

In certain instances where performance braking is required, e.g., race cars, it may be desirable to apply a plasma coating, as described earlier, to the outside surface 58 of layers 54 and 56.

Figure 6:
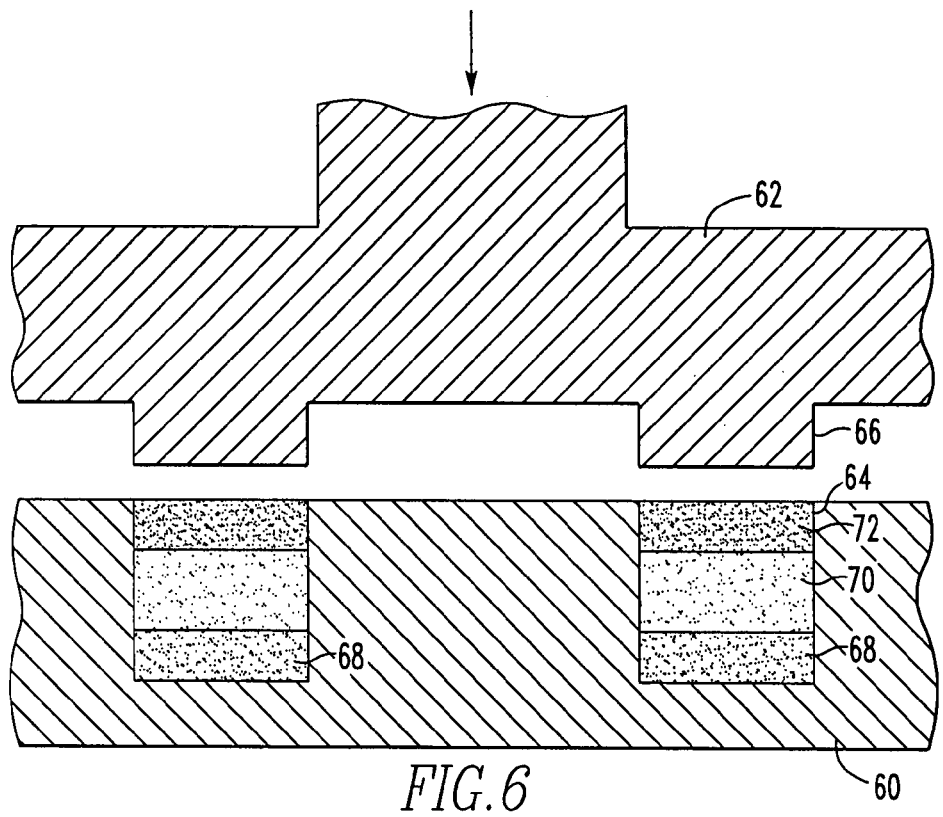
FIG. 6 is a cross-section of a mold for making preforms of brake rotors of the invention.

Referring now to FIG. 6, there is illustrated a mold 60 in cross section and press 62 for applying pressure to powdered materials in mold 60 for purposes of producing a green body. Mold 60 shows a recess 64 containing powders for forming into a rotor. Press 62 has a complementary protrusion 66 for applying pressure to the powder in the mold. In one embodiment of the invention, a first layer of powder 68 is provided in the mold. This first layer of powder comprises, for example, titanium powder mixed with silicon carbide powder in the desired proportions to subsequently provide the wear layers. The second layer 70 of powder comprises a metallic powder, such as titanium powder, which is spread uniformly over the first layer 68. A third layer 72, e.g., titanium powder mixed with silicon carbide powder, is spread over second layer 70, as shown in FIG. 6. Thereafter, press 62 is used to press the powder in the mold to provide a green body. Pressures up to 1500 tons can be used. Thereafter, the green body is sintered to provide a rotor. The rotor can be machined after sintering to provide the final dimensions.

All ranges provided herein include all the numbers within the range, as if specifically set forth.

Having described the presently preferred embodiments, it is to be understood that the invention may be otherwise embodied within the scope of the appended claims.

What is claimed is:

1. A process for making an improved titanium brake rotor, comprising:
   (a) providing titanium or a titanium alloy powder having an average particle size of about 1-20 microns, a mean aspect ratio of about 5 to 300, and specific surface area of at least about 25 m²/g;
   (b) mixing with said titanium or titanium alloy powder, nonmetallic material to provide a mixture;
   (c) providing a brake rotor mold:
      (i) pouring a first layer of said mixture into said mold;
      (ii) pouring a second layer of said titanium powder into said mold on top of said first layer; and
      (iii) pouring a third layer of said mixture on top of said nonmetallic powder layer;
   (d) compressing the powder in said mold to form a preformed brake rotor; and
   (e) sintering said preform to provide a brake rotor having first and second opposed sides having nonmetallic containing wear layers on each of said sides.

2. The process in accordance with claim 1 including providing 5-60 wt. % nonmetallic material in said mixture.

3. The process in accordance with claim 1 wherein said nonmetallic material is at least one of the group consisting of silicon carbide, boron carbide, tungsten carbide, chromium carbide, alumina., zirconium oxide, silicon nitride, boron nitride, and titanium diboride, solely or in various combinations with each other.

4. The process in accordance with claim 1 wherein said nonmetallic material is silicon carbide.

5. The process in accordance with claim 1 wherein said sintering is performed in a temperature range of 1400° to 2200° F.

6. The process in accordance with claim 1 wherein said sintering is performed in a temperature range of 1500° to 2100° F.

7. The process in accordance with claim 1 wherein sintering is carried out by utilizing microwaves or conventional radiation-conduction-convection heating.

8. The process in accordance with claim 1 wherein said brake rotor is densified to 50-75%.

9. The process in accordance with claim 1 wherein densification is at least 95%.

10. The process in accordance with claim 1 wherein densification is in the range of 96-100%.

11. The process of claim 1 including applying a coating to said first and second sides of said rotor, said coating comprising a bond coat containing nickel, an intermediate coat comprising zirconium oxide, chromium carbide, and nickel, and a top coat comprising zirconium oxide and chromium carbide.

12. The process of claim 11 wherein said top coat comprises about 65 to 75 parts by weight zirconia and about 25 to 35 parts by weight chromium carbide.

13. The process of claim 11, the bond coat further contains aluminum.

14. The process of claim 13, wherein the top coat and the intermediate coat contain a lesser amount of nickel and aluminum than the bond coat.

15. The process of claim 1 including applying to first and second sides, coatings comprised of a bond coat of about 4.5 wt % aluminum and about 95.5 wt % nickel; an intermediate coat of about 70 parts by weight zirconia, 30 parts by weight of a composition as used for the bond coat, and 10 parts by weight chromium carbide; and a top coat of about 70 parts by weight zirconium oxide and about 30 parts by weight chromium carbide.

16. The process of claim 1 wherein said rotor is a single or double vaned rotor.

17. A process for making a brake rotor, comprising:
(a) providing metallic powder having an average particle size of about 1-20 microns, a mean aspect ratio of about 5 to 300, and specific surface area of at least about 25 m$^2$/g;
(b) mixing with said metallic powder, 5-70 wt. % of a nonmetallic material to provide a mixture;
(c) providing a brake rotor mold:
  (i) pouring a first layer of said mixture into said mold;
  (ii) pouring a second layer of said metallic powder into said mold on top of said first layer; and
  (iii) pouring a third layer of said mixture on top of said metallic powder layer;
(d) compressing the powder to form a preformed brake rotor; and
(e) sintering said preform to provide a brake rotor having first and second sides having nonmetallic containing wear layers on each of said sides.

18. The process in accordance with claim 17 wherein the metallic powder is selected from the group consisting of titanium, steel, stainless steel, and cast iron.

19. The process in accordance with claim 17 wherein the nonmetallic material is selected from the group consisting of silicon carbide, boron carbide, tungsten carbide, chromium carbide, alumina, zirconium oxide, silicon nitride, boron nitride, and titanium diboride, solely or in various combinations with each other.

20. The process in accordance with claim 17 including providing 5-60 wt. % nonmetallic material in said mixture.

21. The process in accordance with claim 17 wherein said nonmetallic material is silicon carbide.

22. The process in accordance with claim 17 wherein said sintering is performed in a temperature range of 1400° to 2200° F.

23. The process in accordance with claim 17 wherein said sintering is performed in a temperature range of 1500° to 2100° F.

24. The process in accordance with claim 17 wherein sintering is carried out by utilizing microwaves.

25. The process in accordance with claim 17 wherein said brake rotor is densified to 50-75%.

26. The process in accordance with claim 17 wherein densification is at least 95%.

27. The process in accordance with claim 17 wherein densification is in the range of 96-100%.

28. A process for making an improved titanium brake rotor, comprising:
(a) providing titanium or a titanium alloy powder having an average particle size of about 1-20 microns, a mean aspect ratio of about 5 to 300, and specific surface area of at least about 25 m$^2$/g;
(b) mixing with said titanium or titanium alloy powder, 5 to 60 wt. % of a silicon carbide material to provide a mixture;
(c) providing a brake rotor mold:
  (i) pouring a first layer of said mixture into said mold;
  (ii) pouring a second layer of said titanium powder into said mold adjacent said first layer; and
  (iii) pouring a third layer of said mixture into said mold adjacent said titanium powder layer;
(d) compressing the powder to form a preformed brake rotor; and
(e) sintering said preform to provide a brake rotor having first and second opposed sides having silicon carbide wear layers on each of said sides.

29. A process for making a brake rotor component comprising:
(a) mixing about 30-95 parts by weight titanium or a titanium alloy with about 5-70 parts by weight of a nonmetallic particulate material, the titanium or titanium alloy comprising a powder having an average particle size of about 1-20 microns, a mean aspect ratio of about 5 to 300, and specific surface area of at least about 25 m$^2$/g;
(b) compressing the mixture to form a preform,
(c) sintering the preform at an elevated temperature to form a brake rotor.

30. The process of claim 29 wherein step (b) includes adding an organic binder to the mixture.

31. The process of claim 29 wherein said particulate material comprises a ceramic selected from the group consisting of silicon carbide, boron carbide, tungsten carbide, chromium carbide, alumina, silicon nitride, boron nitride, titanium diboride, and mixtures thereof.

32. The process of claim 29 wherein said particulate material has a thermal conductivity at least twice that of titanium.

33. The process of claim 29 wherein said particulate material has a higher melting point than titanium.

34. The process of claim 29 wherein said rotor has an outer surface, and further comprising:
   (d) coating said outer surface with a bond coat containing nickel, an intermediate coat comprising zirconium oxide, chromium carbide, and nickel, and a top coat comprising about 65 to 75 parts by weight zirconium oxide and about 25 to 35 parts by weight chromium carbide.

35. The process of claim 34 wherein said step of coating comprises plasma spraying.

36. The process of claim 34, the bond coat further containing aluminum.

37. The process of claim 36, wherein the top coat and the intermediate coat contain a lesser amount of nickel and aluminum than the bond coat.

38. The process of claim 34 wherein said outer surface comprises a bond coat of about 4.5 wt % aluminum and about 95.5 wt % nickel; an intermediate coat of about 70 parts by weight zirconia, 30 parts by weight of a composition as used for the bond coat, and 10 parts by weight chromium carbide; and a top coat of about 70 parts by weight zirconium oxide and about 30 parts by weight chromium carbide.

39. The process of claim 34 wherein the zirconium oxide is yttria stabilized.

40. A brake rotor made by the process of claim 34, said outer surface comprising a braking surface.

* * * * *